United States Patent [19]
Couch et al.

[11] Patent Number: 5,786,807
[45] Date of Patent: Jul. 28, 1998

[54] CONVERTIBLE PERIPHERAL INPUT DEVICE

[75] Inventors: Johnny D. Couch, Redwood City; Sarah Mason, Foster City; Ira L. Velinsky, Saratoga, all of Calif.; Steven Kevin Guerrera, Millford, Mass.; Gregory Hunter, Westwood, Mass.; John Gundlach, Rowley, Mass.; Masanori Kudou, Kawasaki, Japan

[73] Assignee: Sega Enterprises, Ltd., Tokyo, Japan

[21] Appl. No.: 654,396

[22] Filed: May 28, 1996

(Under 37 CFR 1.47)

Related U.S. Application Data

[63] Continuation-in-part of Ser. No. 455,055, May 31, 1995, abandoned.

[51] Int. Cl.⁶ .......................................... G09G 5/08
[52] U.S. Cl. .......................... 345/161; 273/148 B; D21/48
[58] Field of Search ................................. 345/161, 163, 345/167, 160, 157, 169; 273/148 B; 463/38; D14/100, 107, 114; D21/48

[56] References Cited

U.S. PATENT DOCUMENTS

| | | |
|---|---|---|
| 4,648,603 | 3/1987 | Hayford, Jr. . |
| 4,739,451 | 4/1988 | Kuba . |
| 4,969,647 | 11/1990 | Mical et al. . |
| 5,253,836 | 10/1993 | Tso . |
| 5,267,181 | 11/1993 | George . |

FOREIGN PATENT DOCUMENTS 389679  10/1990  European Pat. Off. .

*Primary Examiner*—Regina Liang
*Attorney, Agent, or Firm*—Price, Gess & Ubell

[57] ABSTRACT

A convertible peripheral input device comprises a control pad and a multiaxis input device selectably mounted on either side of the control pad so that the multiaxis input device can be positioned for right-hand use or left-hand use according to the user's preference. The multiaxis input device can be rotated from one position to another by use of a hinge mechanism with two points of rotation; one for rotation of the multiaxis input device 180 degrees relative to the hinge mechanism and the second point of rotation allowing the hinge mechanism to rotate 180 degrees relative to the control pad bottom surface. The rotatable hinge mechanism may be used with videogame control pads and joysticks as well as keyboards with mouse controllers.

18 Claims, 6 Drawing Sheets

CONVERTIBLE PERIPHERAL INPUT DEVICE

This is a continuation-in-part application of U.S. Ser. No. 08/455,055, filed May 31, 1996, now abandoned.

BACKGROUND OF THE INVENTION

1. Field of the Invention

The present invention generally relates to the use of peripheral input devices for use with computers, including videogame consoles, and more particularly to the use of a hinge mechanism which permits conversion of a peripheral device from right-handed use to left-handed use.

2. Related Application Data

The following related applications contain subject matter in common with the present application.

U.S. Design Patent Application entitled CONTROL PAD, application Ser. No. 29/036,218, filed Mar. 15, 1995.

U.S. Design Patent Application entitled CONTROL PAD WITH CONTROL STICK, application Ser. No. 29/036,221, filed Mar. 15, 1995.

U.S. Design Patent Application entitled CONTROL PAD WITH CONTROL STICK, application Ser. No. 29/036,205, filed Mar. 15, 1995.

U.S. Design Patent Application entitled CONTROL STICK AND BASE, application Ser. No. 29/036,220, filed Mar. 15, 1995.

U.S. Design Patent Application entitled CONTROL PAD WITH DUAL CONTROL STICK, application Ser. No. 29/036,219, filed Mar. 15, 1995.

There is also a related utility patent application entitled A PERIPHERAL INPUT DEVICE WITH SIX-AXIS CAPABILITY, Ser. No. 08/454,609, filed on May 31, 1995.

3. Description of the Related Art

There is a large variety of computer input devices which can be used alone or in combination with other peripheral input devices. In common use are a joystick and a control pad with a raster-based computer game. Also commonly used are a keyboard and a mouse controller during operation of a personal computer. When these devices are used in combination, they are arranged to suit the user's orientation and preference. Some users prefer to use the mouse controller on the right hand side of the keyboard. Other users prefer it to be located to the left of the keyboard. The physical attachment of the two peripheral devices, or even a decision whether to attach them to each other at all, represents a significant choice. Moreover, the original positioning may make a desired combination of the devices ergonomically difficult.

SUMMARY OF THE INVENTION

It is a general object of the present invention to provide an improved and useful convertible peripheral input device in which the above-mentioned problems are eliminated.

A more specific object of the present invention is to provide a system of combining peripheral input devices which can be easily and routinely convertible from right-handed use to left-handed use, and back to the original configuration.

In order to achieve the above-mentioned objects, there is provided according to the present invention a convertible peripheral input device comprising:

a control pad having a bottom surface;

a multiaxis input device having a bottom surface; and a hinge member having a first end and a second end opposite to the first end, the hinge member being rotatably mounted to the control pad substantially 180 degrees with respect to the bottom surface of the control pad at the first end, the hinge member being rotatably mounted to the multiaxis input device substantially 180 degrees with respect to the bottom surface of the multiaxis input device at the second end, wherein the multiaxis input device is movable to either the right or left side of the control pad.

According to the present invention, the hinge mechanism has two points of rotation. The first is on the bottom surface of the control pad. This rotation point allows the hinge mechanism to rotate from one side of the control pad to the other, operating in a semicircular arch with the bottom surface of the control pad acting as the diameter of the arch. The second rotation point for the hinge mechanism is located at the bottom surface of the multiaxis input device. This rotation point allows the multiaxis input device to rotate 180 degrees relative to the plane of the bottom surface of the control pad. Based upon these two rotational degrees of freedom, the hinge mechanism allows the multiaxis input device to be moved from one side of the control pad to the other without having to completely disconnect the multiaxis input device from the control pad.

In one embodiment of the present invention, the control pad has a first opening in the bottom surface thereof, and the first end of the hinge member has a first protrusion being fit in the first opening so that the hinge member is rotatable with respect to the bottom surface of the control pad. The hinge member may further comprise a third end extending in the same direction as the first end and a fourth end extending in the same direction as the second end, the control pad having a second opening in the bottom surface thereof, the third end having a second protrusion being fit in the second opening of the control pad.

In another embodiment of the present invention, the control pad has a first protrusion in the bottom surface thereof, and the first end of the hinge member has a first recess being fit to the first protrusion so that the hinge member is rotatable with respect to the bottom surface of the control pad. The hinge member may further comprise a third end extending in the same direction with the first end and a fourth end extending in the same direction as the second end, the control pad having a second protrusion in the bottom surface thereof, the third end having a second recess being fit to the second protrusion of the control pad.

Additionally, in another embodiment of the present invention, the control pad includes two raised portions each having a sidewall and a space formed between the sidewalls of the two raised portions in the bottom surface of the control pad, each of the sidewalls being perpendicular to the bottom surface of the control pad and having a slot-shaped opening therein, each of the raised potions having a notch adjacent to and continuous with the respective slot-shaped opening, the hinge member having a third end extending in the same direction as the first end, each of the first end and the third end having a protrusion being inserted into the respective notches and slot-shaped openings so that the protrusions are rotatable within the slot-shaped openings and movable along an extending direction of the slot-shaped openings. Each of the protrusions of the hinge member may comprise a cylindrical portion being fit in the respective one of the slot-shaped openings and a rectangular raised portion being inserted into the respective one of the notches.

Additionally, the convertible peripheral input device according to the present invention may further comprise a securing device to rigidly secure the hinge member to the control pad. The securing device may comprise a screw fastened to the control pad through the hinge member.

Additionally, the multiaxis input device may be a joystick, a trackball or a mouse controller.

Other objects, features and advantages of the present invention will become more apparent from the following detailed description when read in conjunction with the following drawings.

DETAILED DESCRIPTION OF THE PREFERRED EMBODIMENTS

The present invention is described below with reference to a convertible peripheral input device available for use with the Sega Saturn™ Videogame system. The purpose of this description with reference to the particularly preferred embodiment is to illustrate the present invention, and it is not intended to limit the scope of the claims appended hereto. Moreover, while the invention is described with reference to a joystick and control pad for use with a videogame console, it is understood that the term peripheral input device and control pad are used more broadly than as used in connection with the preferred embodiments. For example, instead of a joystick and a control pad, the hinge mechanism of the present invention could be used to rotate a mouse controller (a multiaxis input device) from one side of a keyboard (control pad) to the other side of the keyboard. Additionally, the multiaxis input device includes a trackball as an input device.

Figure 1:
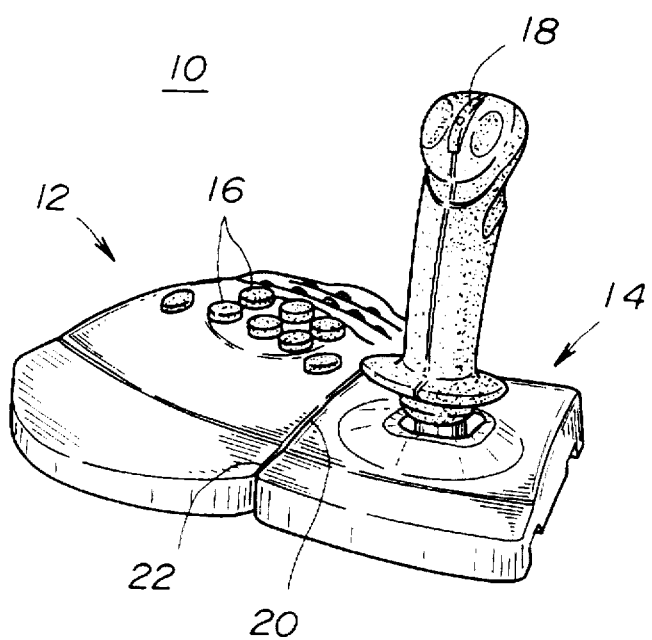
FIG. 1 is a perspective view of a convertible peripheral input device according to a first embodiment of the present invention.

FIG. 1 shows a convertible peripheral input device 10 according to a first embodiment of the present invention. In FIG. 1, the convertible peripheral input device 10 comprises a control pad 12 and a three-axis joystick 14. The control pad 12 has buttons and keys for inputting various data to the video console. The joystick has a thumb-operated z-axis controller 18. The two devices are joined along the control pad body edge 20 and the joystick base edge 22.

Figure 2:
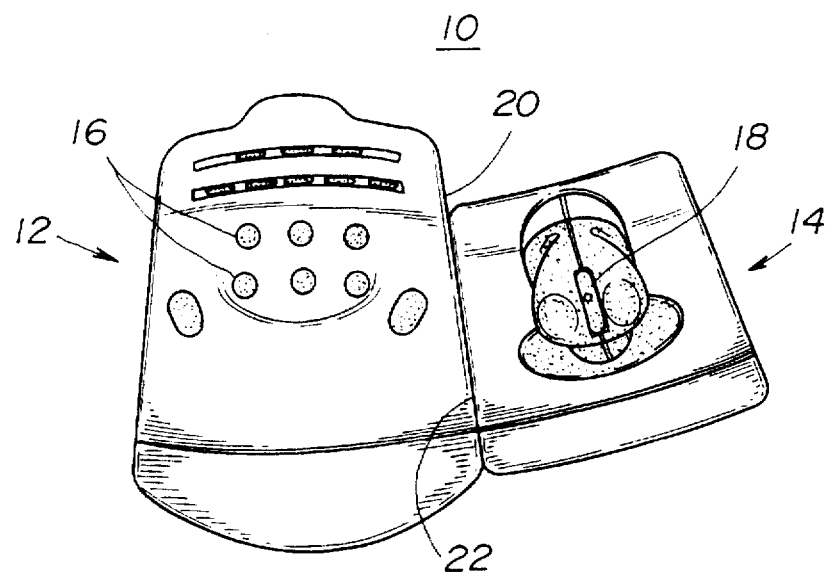
FIG. 2 is a plan view of the convertible peripheral input device shown in FIG. 1.
Figure 3:
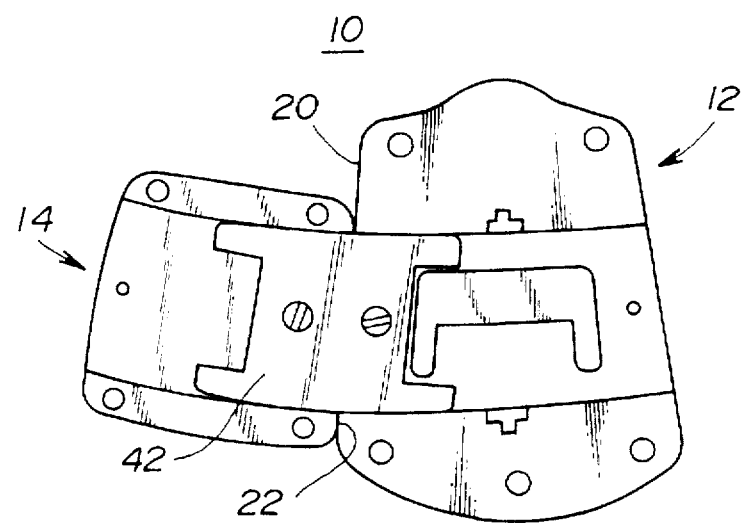
FIG. 3 is a bottom view of the convertible peripheral input device shown in FIG. 1.

FIG. 2 is a plane view of the convertible peripheral input device in a state where the joystick 14 is arranged to be operated by a right hand. FIG. 3 is a bottom view of the convertible peripheral input device 10 in the state shown in FIG. 2. In FIGS. 2 and 3, although the joystick 14 is located on the right-hand side of the control pad 12, the joystick 14 can be located on the left hand side of the control pad 12, as will be described later. As shown in FIG. 3, the control pad and the joystick 14 are coupled by a hinge mechanism including a hinge member 42. The change of the location of the joystick 14 relative to the control pad 12 can be achieved by an operation of the hinge mechanism.

Figure 4:
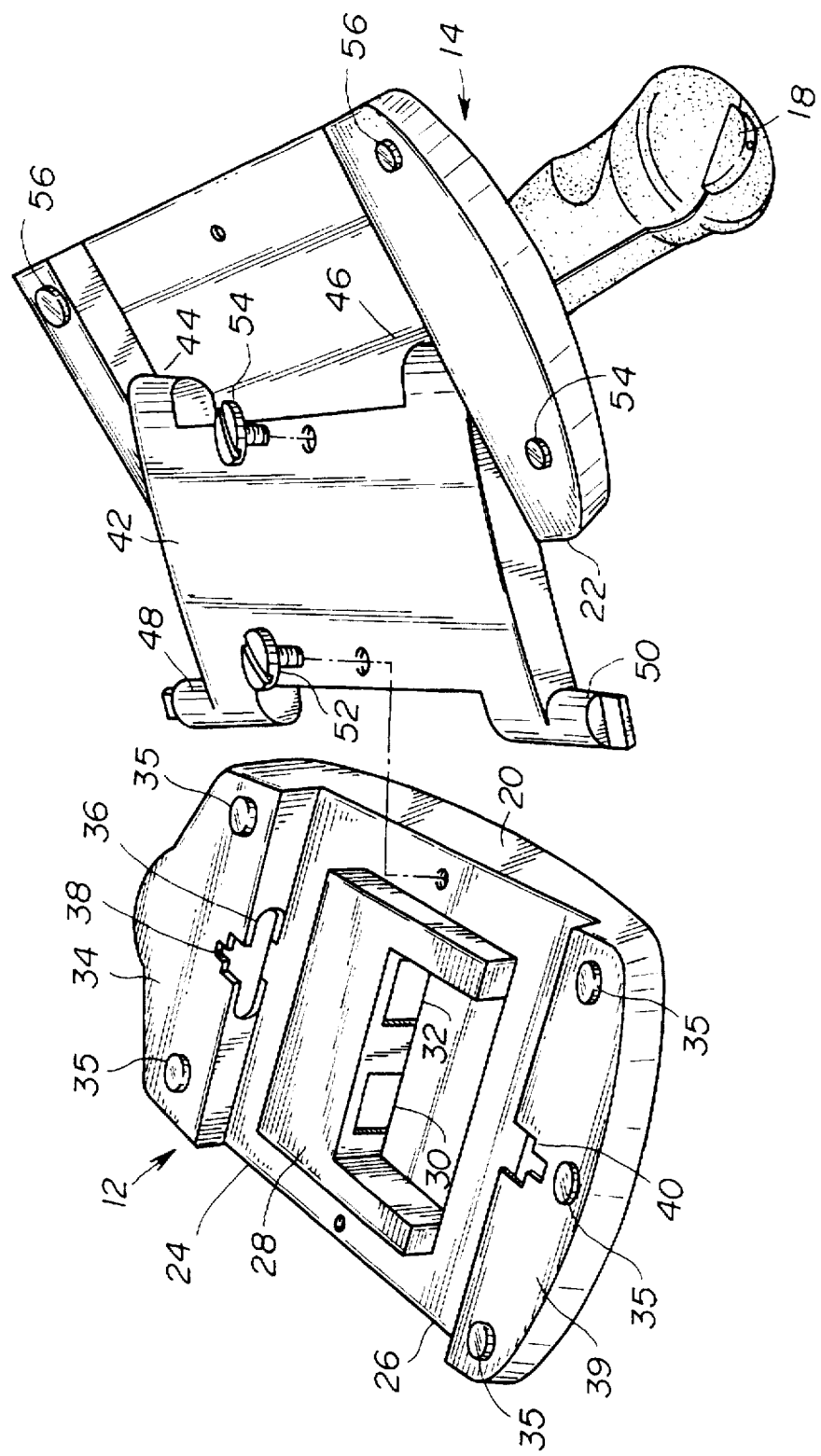
FIG. 4 is an exploded perspective view of the convertible peripheral input device shown in FIG. 1.

FIG. 4 is an exploded perspective view of the convertible peripheral input device 10 in a state where the joystick 14 is separated from the control pad 12. The bottom surface of the control pad 12 has a first channel 24 and second channel 26. The first and second channels are substantially parallel to each other, and extend between opposite sides of the body of the control pad 12. These channels 24 and 26 may be slightly curved depending on the angle of the control pad body edge 20. The bottom surface of the control pad 12 also has an input port protector 28 which provides the space necessary for a first input port 30 and a second input port 32. In the present embodiment, two joysticks 14 can be electrically connected to the single control pad 12 which is provided with a microprocessor by the first and second input ports 30 and 32. Adjacent to the input port protector 28, on either side of the channels 24 and 26, respectively, there are a first raised portion 34 and a second raised portion 39. Stabilizers 35, in the nature of rubber disks, are provided on the first and second raised portions 34 and 39 to insure that the control pad 12 rests stably and flatly on the playing surface. The first and second raised portions 34 and 39 are preferably of greater height than the input port protector 28, although this is not essential.

In one of the side walls defining the first channel 24, there is a slot-shaped aperture 36. On the first raise portion 34 there is a notch 38 which is continuous with the slot-shaped aperture 36. Another notch 40 is seen in the second raised portion 39. These apertures/notches cooperate with protrusions extending from the hinge member 42.

The hinge mechanism including the hinge member 42 has two points of rotation. In this embodiment, the hinge member 42 is rotatably fixed to the base of the joystick 14 by coupling mechanisms 44 and 46. The coupling mechanisms 44 and 46 can consist of either protrusions in sidewalls formed in a bottom surface of the joystick 14 mating with apertures in the hinge mechanism, or it can be reversed, where the protrusions extend out from the hinge mechanism for mating with apertures in the sidewalls in the bottom surface of the joystick 14. At the other end of the hinge member 42 is the second point of rotation under the control pad 12. In the present embodiment, the hinge member 42 has first and second hinge protrusions 48 and 50, respectively. The protrusions 48 and 50 mate with apertures/notches 36/38 and 40, respectively, to provide the second point of rotation. The slot-shaped aperture/notch approach permits the hinge mechanism/joystick to be completely removed from the control pad, when they are not wanted.

It should be noted that the bottom surface of the base of the joystick 14 is also provided with stabilizers 56. Additionally, screws 52 and 54 are provided for securing the hinge member 42 to the control pad 12 and the joystick 14, respectively.

Figure 5C:
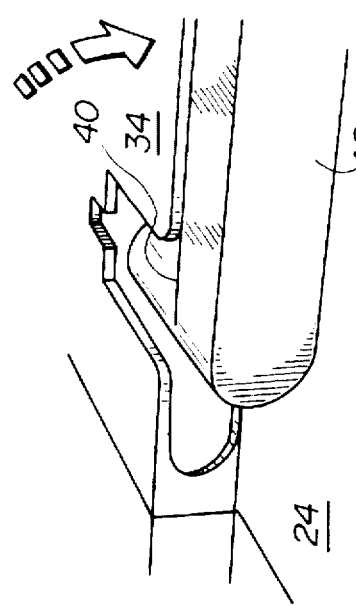
FIGS. 5A, 5B, 5C and 5D are illustrations for explaining a sequence for installing a hinge member on a control pad.
Figure 5D:
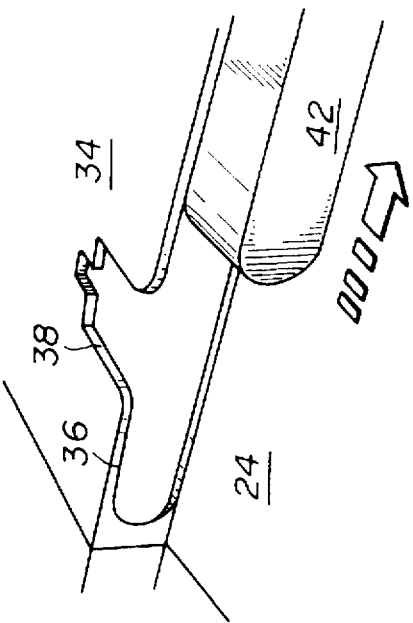
Figure 5A:
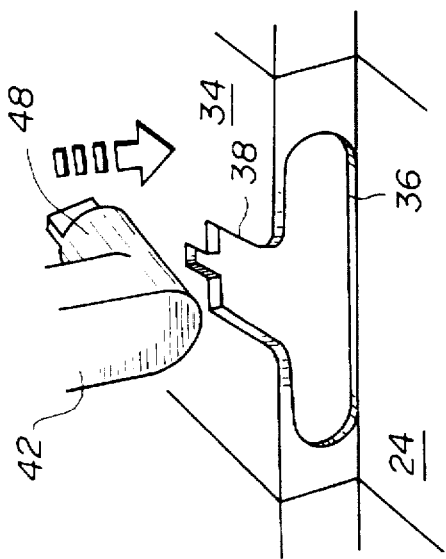
Figure 5B:
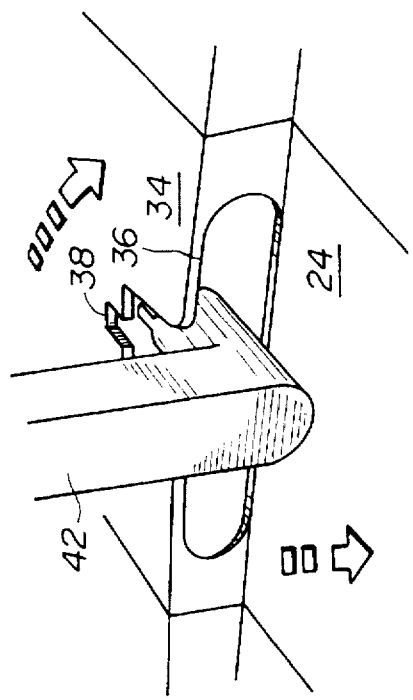

A description will now be given of an operation for installing the hinge member 42 to the control pad 12. FIGS. 5A through 5D show the sequence of positions used in the installation of the hinge member 42 into the aperture/notch 36/38. FIG. 5A shows the hinge member 42 in a position substantially perpendicular to the bottom surface of the control pad 12. The hinge protrusion 48 has a rectangular raised portion which is adapted to be received within the notch 38, allowing the hinge mechanism to be lowered, in a direction indicated by an arrow in FIG. 5A, into the first channel 24 so that the cylindrical portions of the protrusion 48 is aligned with the slot-shaped aperture 36. FIG. 5B shows the hinge mechanism being lowered into a position within the slot-shaped aperture 36. In FIG. 5C, the hinge member 42 is rotated from the 12 o'clock position to the 3 o'clock position. 0This rotation causes the rectangular raised portion of the protrusion 48 to be locked within the notch 38 because the notch is dimensioned to receive the rectangular raised portion when it is vertical and not when it is horizontal. Once the protrusion 48 is inserted into the notch 38, the protrusion 48 can be pulled in the direction of the arrow in FIG. 5D to position the hinge member 42 and the control pad 12 and the joystick 14 to be secured along adjacent edges 20 and 22. It should be noted that the protrusion 50 is inserted into the notch 40 formed in the second raised portion 39 in the same manner and at the same time as the insertion of the protrusion 48.

Figure 6:
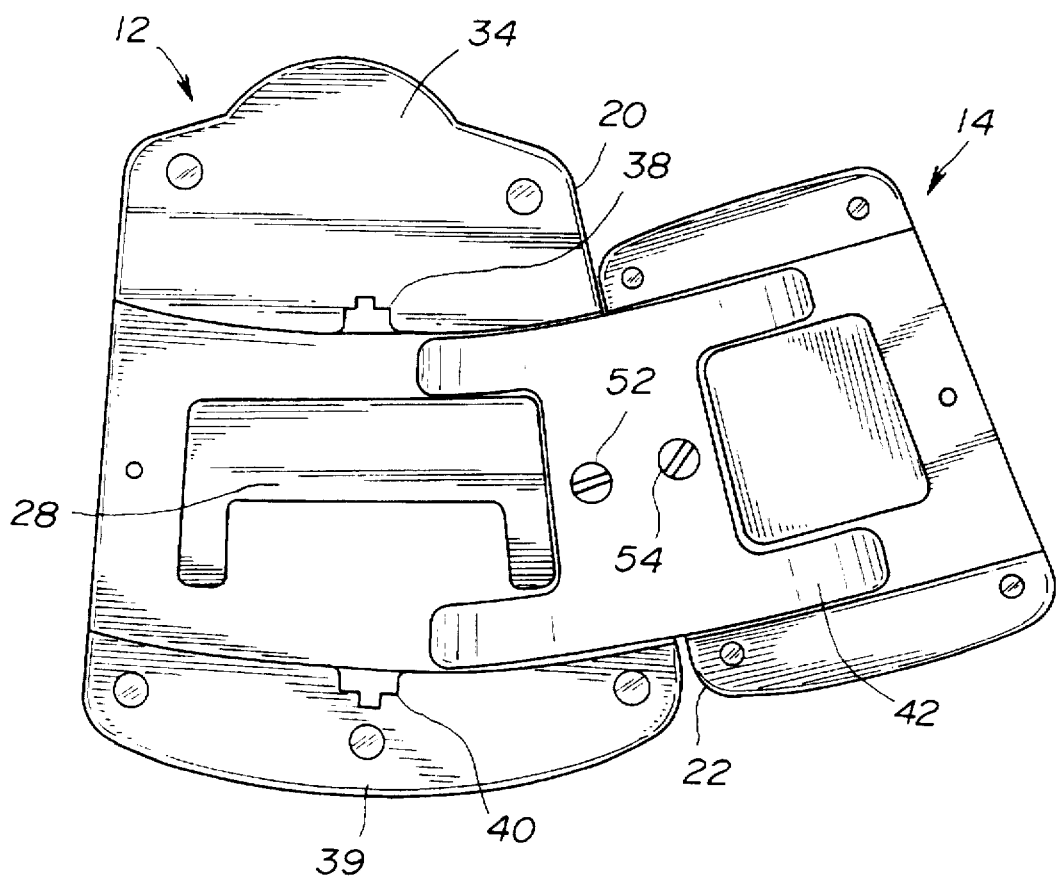
FIG. 6 is a bottom view of the control pad and a joystick assembled together.

The final assembly is shown in FIG. 6. In this view, the hinge member 42 secures the base of the joystick 14 along the edge 20 of the control pad 12 and screws 52 and 54 are in place to secure the two devices relative to each other. FIG. 6 also provides a good view for describing how the joystick 14 could be rotated from its place along the control pad edge 20 to a position on the opposite side of the control pad 12. Once the screws 52 and 54 are removed, the hinge member 42 can be rotated 180 degrees about the protrusions 48 and 50 with respect to the bottom surface of the control pad 12. This rotation would cause the joystick 14 to face down 180 degrees out of phase from the desired operating position. Thus, the joystick 14 is also rotated 180 degrees about the coupling mechanisms 44 and 46 to cause the joystick 14 to face upward. In this manner, the convertible peripheral input device 10 is changed from a control pad 12 with a joystick 14 in the left-handed operating position to a control pad 12 with a joystick 14 in the right-handed operating position. The screws 52 and 54 can be used to secure the control pad 12 and the joystick 14 in this configuration.

In the above-mentioned first embodiment, since the hinge member 42 is moved along the slot-shaped aperture 36 in a direction toward the side on which the joystick 14 is located, two joysticks 14 can be attached to the single control pad 12 on the left and right sides thereof, if it is desired. That is, an additional joystick can be installed on the opposite side so as to form a six-axis input device. The input ports 30 and 32 are used to electrically connect two joysticks to the control pad 12.

A description will now be given of a second embodiment of the present invention. The second embodiment of the present invention is limited to installing only a single joystick to the control pad 12.

Figure 7:
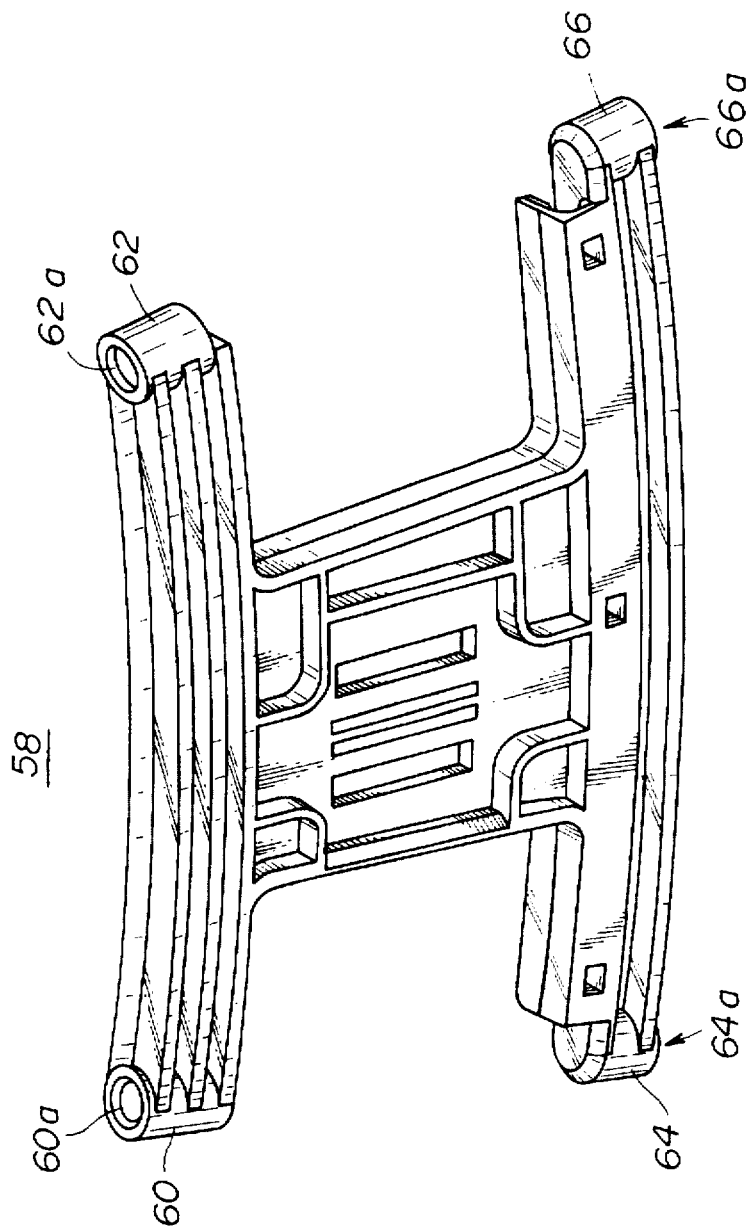
FIG. 7 is a perspective view of a hinge member used in a second embodiment of the present invention.

FIG. 7 is a perspective view of a hinge member 58 which is a part of a convertible peripheral input device according to the second embodiment of the present invention. The basic structure of the second embodiment is the same as that of the above-mentioned first embodiment, and descriptions thereof will be omitted. The hinge member 58 shown in FIG. 7 has a first end 60, a second end 62, a third end 64 and a fourth end 66. The first end 60 and the third end 64 extend in the same direction, and the second end 62 and the fourth end 66 extend in a direction opposite to the direction of the first and third ends 60 and 64. The first end 60, the second end 62, the third end 64 and the fourth end 66 have recesses 60a, 62a, 64a and 66a, respectively (the recesses 64a and 66a do not appear in the figure). The second end 62 and the fourth end 66 are rotatably mounted in the bottom of the joystick 14 in a similar manner as that of the first embodiment. That is, the recesses 62a and 66a fit on respective protrusions provided in the bottom of the joystick 14.

In the second embodiment, the slot-shaped aperture 36 and the notches 38 and 40 are not provided as is in the first embodiment. Alternatively, protrusions are formed in the center of the sidewalls of the channels 24 and 26 where the slot-shaped apertures 36 were formed. The protrusions are inserted into the respective recesses 60a and 64a of the hinge member 58, and thereby the hinge member 58 is rotatable 180 degrees with respect to the bottom of the control pad 12. Accordingly, in the second embodiment, only a single joystick can be installed to the control pad to be situated either to the right or left of the control pad, but a structure of the hinge mechanism is simple as compared to that of the first embodiment.

While the present invention has been described with reference to preferred embodiments, those of ordinary skill in the art will recognize that variations in the design are possible without deviating from the invention or from the scope of the appended claims.

What is claimed is:

1. A convertible peripheral input device comprising:

a control pad having a bottom surface;

a multiaxis input device having a bottom surface; and a hinge member having a first end and a second end opposite to said first end, said hinge member being rotatably mounted to said control pad substantially 180 degrees with respect to said bottom surface of said control pad at said first end, said hinge member being rotatably mounted to said multiaxis input device substantially 180 degrees with respect to said bottom surface of said multiaxis input device at said second end, wherein said multiaxis input device is movable to either the right or left side of said control pad.

2. The convertible peripheral input device as claimed in claim 1, wherein said control pad has a first opening in said bottom surface thereof, and said first end of said hinge member has a first protrusion being fit in said first opening so that said hinge member is rotatable with respect to said bottom surface of said control pad.

3. The convertible peripheral input device as claimed in claim 2, wherein said hinge member further comprises a third end extending in the same direction as said first end and a fourth end extending in the same direction as said second end, said control pad having a second opening in said bottom surface thereof, said third end having a second protrusion being fit in said second opening of said control pad.

4. The convertible peripheral input device as claimed in claim 1, wherein said control pad has a first protrusion in said bottom surface thereof, and said first end of said hinge member has a first recess being fit to said first protrusion so that said hinge member is rotatable with respect to said bottom surface of said control pad.

5. The convertible peripheral input device as claimed in claim 4, wherein said hinge member further comprises a third end extending in the same direction as said first end and a fourth end extending in the same direction as said second end, said control pad having a second protrusion in said bottom surface thereof, said third end having a second recess being fit to said second protrusion of said control pad.

6. The convertible peripheral input device as claimed in claim 1, wherein said control pad includes two raised portions each having a sidewall and a space formed between said sidewalls of said two raised portions in said bottom surface of said control pad, each of said sidewalls being perpendicular to said bottom surface of said control pad and having a slot-shaped opening therein, each of said raised portions having a notch adjacent to and continuous with the respective slot-shaped opening, said hinge member having a third end extending in the same direction as said first end, each of said first end and said third end having a protrusion being inserted into the respective notches and slot-shaped openings so that said protrusions are rotatable within said slot-shaped openings and movable along an extending direction of said slot-shaped openings.

7. The convertible peripheral input device as claimed in claim 6, wherein each of said protrusions of said hinge member comprises a cylindrical portion being fit in the respective one of said slot-shaped openings and a rectangular raised portion being inserted into the respective one of said notches.

8. The convertible peripheral input device as claimed in claim 1, further comprising a securing device to rigidly secure said hinge member to said control pad.

9. The convertible peripheral input device as claimed in claim 1, wherein said securing device comprises a screw fastened to said control pad through said hinge member.

10. The convertible peripheral input device as claimed in claim 1, wherein said multiaxis input device is a joystick.

11. The convertible peripheral input device as claimed in claim 1, wherein said multiaxis input device is a trackball.

12. The convertible peripheral input device as claimed in claim 1, wherein said multiaxis input device is a mouse controller.

13. A combination peripheral input device for a video game apparatus comprising:

a control pad having operator buttons on an upper surface and a right and a left side edge;

a joystick member having a cantilevered controller extending from an upper surface and a right and a left side edge which are respectively compatible with the control pad right and left side edges;

hinge member rotatably connected to a respective bottom surface of the control pad and the joystick member; and means for releasably locking the hinge member to both the control pad and the joystick member, whereby the joystick member can be positioned on either the right or the left side edge of the control pad by movement of the hinge member.

14. The combination peripheral input device of claim 13 wherein the hinge member is also slidably connected to the bottom surface of the control pad.

15. The combination peripheral input device of claim 13 further including an input port extending traversely to the control pad button surface and an input port protector extending above the input port, the hinge member being indented on opposite sides to accommodate the input port protector.

16. A combination peripheral input device comprising:

a control pad having operator buttons on an upper surface and a right and a left side edge;

a joystick member having a cantilevered controller extending from an upper surface and a right and left side edge which are respectively compatible with the control pad right and left side edges; movable means for movably connecting the control pad to the joystick member so that the joystick member can be positioned on either the right or the left side edge of the control pad at the option of the operator, said movable means maintaining operative contact with the control pad and the joystick member during any re-positioning of the joystick member to either the right or the left side of the control pad to the other side; and means for locking the joystick member to the control pad.

17. The combination peripheral input device of claim 16 wherein said movable means rotates the joystick across the control pad.

18. A combination peripheral input device for a video game apparatus comprising:

a control pad having operator buttons on an upper surface and a right and a left side edge;

a joystick member having a cantilevered controller extending from an upper surface and a right and a left side edge which are respectively compatible with the control pad right and left side edges;

a hinge member that is pivotally connected to the control pad with a pivot point that can be traversely moved across a bottom surface of the control pad for movably connecting the control pad to the joystick member so that the joystick member can be positioned on either the right or the left side edge of the control pad at the option of the operator; and means for locking the joystick member to the control pad.

* * * * *